Figure 1:
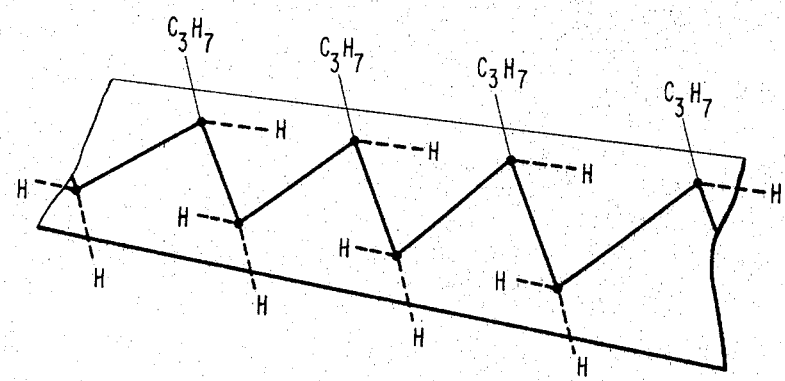

March 25, 1969

G. NATTA ET AL 3,435,018

ISOTACTIC POLYMERS OF STYRENE AND PENTENE-1, AND
PRODUCTS MADE THEREOF
Original Filed June 8, 1955

INVENTORS
GIULIO NATTA
PIERO PINO
GIORGIO MAZZANTI

United States Patent Office 3,435,018
Patented Mar. 25, 1969

3,435,018
ISOTACTIC POLYMERS OF STYRENE AND PENTENE-1, AND PRODUCTS MADE THEREOF
Giulio Natta, Piero Pino, and Giorgio Mazzanti, Milan, Italy, assignors to Montecatini Edision S.p.A., Milan, Italy
Original application June 8, 1955, Ser. No. 514,099. Divided and this application May 5, 1958, Ser. No. 732,810
Claims priority, application Italy, July 27, 1954, 537,425/54
Int. Cl. C08f *1/40, 5/00, 3/00*
U.S. Cl. 260—93.5                          7 Claims This invention relates to new, linear, regular head-to-tail polymers of unsaturated hydrocarbons of the formula

i.e., alpha-olefins, wherein R is a saturated aliphatic radical having more than 2 carbon atoms, an alicyclic radical, or an aromatic radical, copolymers of said unsaturated hydrocarbons with one another, and copolymers of the unsaturated hydrocarbons with at least one other monomer copolymerizable therewith.

This application is a division of our application Ser. No. 514,099, filed June 8, 1955.

The unsaturated hydrocarbons of the general formula as defined above are alpha-olefins in the broad sense, and are thus understood to comprise such derivatives as, for instance, styrene, R being the phenyl radical.

More particularly, the invention relates to high molecular weight crystalline polymers of the higher homologues and derivatives of ethylene as, for instance, pentene-1, hexene-1, styrene and so on.

In the copending application (now abandoned) Ser. No. 514,097, filed June 8, 1955, by the same inventors, there is described and claimed a method for producing the polymers and copolymers of the alpha-olefins using, as polymerization aid a catalyst obtained by mixing a catalytic heavy metal compound such as titanium tetrachloride, and a catalytic metal alkyl compound such as aluminum triethyl, in a solvent inert to the polymers to be formed, such as a saturated aliphatic hydrocarbon, in a ratio such that the number of moles of the metal alkyl component is not more than ten times the number of moles of the heavy metal compound and is preferably less than five times the latter, as for instance, in a molar ratio of 10:1 to 3:1.

As described in said application Ser. No. 514,097, polymerization of the alpha-olefins can be accomplished by mixing an inert solvent solution of the catalytic heavy metal compound with an inert solvent solution of the catalytic metal alkyl component, adding at least one of the alpha-olefins, or a mixture thereof with another monomer such as ethylene, to the catalyst, and heating the mass to effect the polymerization.

In a specific embodiment of that method there may be used advantageously, as the metal alkyl component, a compound in which the alkyl radicals contain the same number of carbon atoms as the alpha-olefin to be polymerized.

In another modification of the described polymerization method, the alpha-olefins or mixtures containing them are polymerized by preparing the catalyst from the catalytic heavy metal compound and the catalytic metal alkyl component in the presence of an olefin, most desirably the alpha-olefin to be polymerized. Or the metal alkyl component and the alpha-olefin, or polymerizable mixture are first brought together, and the heavy metal compound is then added thereto.

The present application is concerned with the alpha-olefin polymers and copolymers obtained by the above-mentioned methods, which products are claimed herein.

These products are, initially, mixtures of linear head-to-tail polymers having no branches longer than R, which mixtures comprise, mainly, amorphous and crystalline polymers which can be separated by fractional dissolution.

These polymers, depending on their steric structure and molecular weight, exhibit very different characteristics. The amorphous polymers have viscous elastic properties which lie between those of a highly viscous liquid and those of an unvulcanized, non-crystallizable elastomer, while the solid highly crystalline polymers, which can be oriented by drawing, are fiber-forming.

Both the amorphous and crystalline polymers are linear, as shown by their infra-red spectra.

The differences in the properties of our two types of polymers must be attributed to a different distribution, along the main chain, of those asymmetric carbon atoms having the same steric configuration.

According to Flory (Principles of Polymer Chemistry, 1953, pp. 55–56, 237–238) a vinyl polymer containing asymmetric carbon atoms as, for example

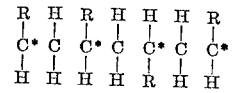

may be considered as a copolymer of two different monomer units

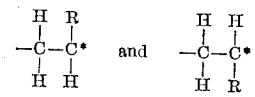

in one of which the asymmetric carbon atom (C*) has an *l*-configuration, and in the other a *d*-configuration.

When such monomer units containing an asymmetric carbon atom showing a *l*- or *d*-configuration recur statistically along the polymer chain, as is generally the case in all of the previously known vinyl polymers, the polymers may be considered as a copolymer of the two types of structural units and, therefore, if the substituent R is much larger than a hydrogen atom, the polymer is substantially non-crystalline and does not show any first order transition point.

In contrast to the structure of the known polymers as illustrated above, our polymers are not copolymers in the sense of Flory, but have a high degree of crystallinity because, apparently at least for long portions of the main chain, all of the asymmetric C atoms have the same steric configuration.

The structure of our new crystalline high molecular weight polymers of the alpha-olefins was determined from X-ray data on drawn fibers of the polymers.

The dimensions of the elementary cell for different alpha-olefin polymers were measured by us and are shown in Table 1 below.

TABLE 1

| Polymer | Identity Period along the chain axis (A.) | X-ray melting point (° C.) | X-ray Density | Density by weight |
|---|---|---|---|---|
| Poly-alpha pentene | 6.60±0.1 | 75 | | 0.87 |
| Polystyrene | 6.65±0.05 | 230 | 1.12 | 1.08 |

NOTE.—The X-rays densities were calculated for polystyrene on the basis of an hexagonal cell (space group R3c having a=21.9 A.). The cell contains 6 chain portions containing each 3 monomeric units.

From the above it is clearly apparent that the identity period along the fiber axis is, in all cases, in the range of 6.5–6.7 A.

By comparing X-ray and density data, it may be seen that each stretch of principal chain included in the elementary cell corresponds to 3 monomeric units

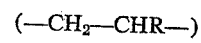

and that, therefore, a regular succession of monomeric units having alternating *d* and *l* asymmetric carbon atoms can be excluded. Among all possible remaining regular successions of *d* and *l* asymmetric carbon which could lead to a crystalline polymer it is believed, on the basis of the X-ray data, that the most probable is the one in which, at least for long portions of the main chain, all the asymmetric C atoms have the same steric configuration.

Figure 2:
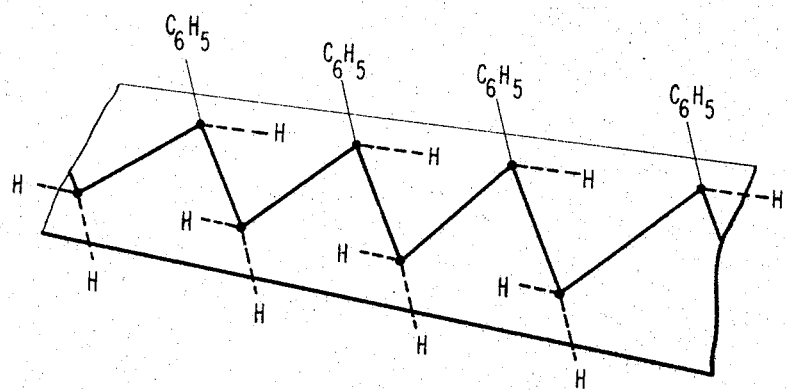

A model of a portion of the main chain of a crystalline polypentene-1 according to the present invention, arbitrarily fully extended in a plane, in which, in said model, the substitutent groups $C_3H_7$ on the tertiary C atoms are all above and their H atoms all below the plane of the chain, is shown in FIGURE 1 of the accompanying drawing. A similar model of a portion of the main chain of a crystalline polystyrene according to the present invention is shown in FIGURE 2 of the drawing.

In this case the stable existence of a planar fully extended paraffinic chain is most unlikely owing to the steric hindrance of the substituent groups R. In the crystalline state, the main chain must therefore assume a non-planar conformation. We have found this conformation to be spiral-like.

The hypothesis of a coiled conformation of the main chain in the crystalline state agrees with the value of the identity period along the same chain (6.5–6.7 A.) which is smaller than the length of the planar, fully extended structure (7.62 A. for 3 monomeric units).

Our linear, regular head-to-tail macromolecules having substantially no branches longer than R and the main chain of which has substantially the kind of structure illustrated in the model (isotactic structure) are recognized in the art (following us) as "isotactic" macromolecules, whereas our macromolecules having substantially no branches longer than R and in which the asymmetric carbon atoms of the two possible steric configurations have a substantially random distribution along the main chain are recognized in the art (following us) as "linear, regular head-to-tail atactic" macromolecules.

The term "isotactic" was originated by one of us, G. Natta, for identifying the structure of the kind as illustrated in the model, our macromolecules having substantially that kind of structure, and the polymers consisting of macromolecules substantially having that kind of structure. (See, for example, the communication to the editor of the Journal American Chemical Society, by Natta et al., published in the Journal of Mar. 20, 1955, received for publication Dec. 10, 1954, and the article by Natta published in the Journal of Polymer Science, April 1955, vol. XIV, Issue No. 82, pp. 143–154, received for publication on Feb. 17, 1955.)

The isotactic structure imparts to the new products properties not previously known for any polymer of an unsaturated hydrocarbon of our type.

In fact those of our polymers having a high molecular weight are, at room temperature, crystalline solids very different, e.g. from the elastomers obtained by known methods from isobutylene, which are crystallizable under stress and show a spiral-like linear chain, but with a different identity period.

The substantial differences in the physical properties of the two types of polymers which we have prepared, are summarized in the following Table 2.

The very remarkable differences in the solubilities of the two types of polymers, amorphous and crystalline, permit of their ready separation by extraction with suitable solvents.

For a given polymeric mixture according to the invention, the crystalline polymers are always less soluble than the amorphous polymers, independently of the molecular weight. The solubilities of polymers of the same type (i.e. amorphous or crystalline) but of different molecular weights decrease slightly and gradually with increase in the molecular weight.

The high molecular weight polymers of aliphatic hydrocarbons or alpha-olefins of the invention, in suitably purified condition, may be molded at suitable temperature to obtain plates or sheets which are transparent. The plates or sheets may be cold-stretched up to about 700%. The breaking load, referred to the section resulting after stretching, may be very high.

It is not necessary to separate the amorphous polymers from the crystalline polymers before producing shaped articles such as filaments, sheets, foils, etc. In fact, it may be preferred, at least in some instances, to mold the polymerizate comprising the amorphous and crystalline polymers to the desired shape, and then remove the amorphous polymers from the shaped object by treating it with a solvent for the amorphous polymers which does not dissolve or appreciably swell the crystalline polymers. For example, in producing filaments, the amorphous polymers of lower molecular weight serve as plasticizers for the crystalline polymers and, by lowering the viscosity of the mass, permit extrusion thereof at lower temperatures and pressures. The plasticizing amorphous polymers also facilitate orientation of the molecules during drawing of the extruded filaments.

Thus, the polymerizate comprising the amorphous and crystalline polymers may be converted by heat to a soft, plastic or even molten mass, extruded through a spinneret to form filaments which are treated with a solvent for the amorphous polymers which are thus dissolved out, leaving filaments consisting of the higher molecular weight, crystalline polymers.

The strongly stretched filaments show unusually high values for the reversible elongation (elasticity) as well as other similarities to wool.

The viscosity of these polymers increases with increase in the molecular weight. The polymers of very low molecular weight (up to a few thousands) occur as viscous liquids, with a very high viscosity index. The polymers of higher molecular weight even higher than 30,000–40,000 still exhibit viscous properties and, therefore, are not true elastomers.

The following examples are given to illustrate preferred embodiments of the invention, it being understood that these examples are not intended as limitative. The average molecular weights of the products were estimated from specific viscosity measurements in tetrahydronaphthalene solutions at a polymer concentration of 0.1 gm. per 100 gms. of solvent, and from intrinsic viscosity measurements. Specific viscosity is the viscosity of the solution less the viscosity of the solvent, divided by the viscosity of the solvent. By "intrinsic viscosity" is meant the

TABLE 2

| Polymer | 1st order transition Temp.,* ° C. | 2nd order transition Temp., ° C. | Measured Density | Solubility In— | | | | |
|---|---|---|---|---|---|---|---|---|
| | | | | Acetone | Ethyl Acetate | Ethyl Ether | Boiling n-heptane | Toluene |
| Crystalline Polyalphapentene | 70–80 | | 0.87 | i | i | S.S. | S | V.S. |
| Amorphous Polyalphapentene | | | | S.S. | S.S. | S | V.S. | V.S. |
| Crystalline Polystyrene | 210–230 | | 1.08 | i | i | i | i | S. |
| Amorphous Polystyrene | | 80–90 | 1.05 | S.S. | S.S. | S | S | V.S. |
| Crystalline Polyalphahexene | <20 | | | | | | | |

*Roentgenographic melting point.
i=insoluble; S.=soluble; V.S.=very soluble; S.S.=slightly soluble.

limit of the ratio between the specific viscosity and concentration, for concentrations tending to zero:

$$\left(C \xrightarrow{\text{limit}} 0 \; \frac{\eta \text{ spec.}}{C}\right)$$

where C is the concentration of the solution in gms./cc.).

In this manner it was estimated that the average molecular weight of the solid amorphous and crystalline polymers of the invention is usually above 20,000. Polymers having an average molecular weight above 2,000 and up to 100,000 or higher may be obtained.

EXAMPLE I 25 gms. of hexene-1, dissolved in 29 gms. of hexane, containing 5.7 gms. of triethyl aluminum, are heated under reflux in a 500 ml. flask fitted with a stirrer, under nitrogen atmosphere. 1.8 gms. of titanium tetrachloride dissolved in hexane are then added and the mixture is allowed to boil under reflux for 5 hours. The obtained solution is treated, after cooling, with methanol, and then with diluted hydrochloric acid, and finally evaporated to dryness.

The formed polymer corresponds to a conversion of the starting hexene-1 higher than 50%. This polymeric material is soluble in gasoline and ether, only slightly soluble in methanol. The portion insoluble in methanol has very marked viscous elastic properties.

EXAMPLE II 45 gms. of pentene-1 and a solution of 5.7 gms. of triethyl aluminum in 250 ml. of heptane are introduced under nitrogen into a 500 ml. flask fitted with a mechanical stirrer, a dropping funnel and a refluxing condenser. The whole is heated to 50° C. and at this temperature a solution of 3.8 gms. of titanium tetrachloride in 20 ml. of n-heptane is dropped into the flask. A spontaneous increase of the temperature up to 70° C. is at once observed. The mass is agitated for 3 hours at this temperature, then the organo-metallic compounds present are decomposed with methanol. The polymer obtained is purified as described in the preceding example. 16.5 gms. of polymer are thus obtained, which are extracted with boiling solvents.

The acetone extracted fraction (A) amounting to 47.8% of the total polymer consists of oily products.

A fraction (B) obtained by extraction with ethyl acetate corresponds to 44.3% of the total polymer and consists of a rubbery, amorphous solid product.

An ether extracted fraction (C) corresponds to 7.9% of the total polymer and consists of a solid polypentene which appears highly crystalline when examined under the X-rays.

EXAMPLE III

A solution of 11.4 gms. of triethyl aluminum in 400 ml. of n-heptane and 250 gms. of monomeric styrene are introduced under nitrogen into a 2150 ml. autoclave. The autoclave is heated to 68° C. and at this temperature a solution of titanium tetrachloride in 50 ml. of heptane is injected under nitrogen into the autoclave. After 3 hours, during which period of time the temperature is kept between 68 and 70° C., a solution of 3.8 gms. of titanium tetrachloride in 50 ml. of heptane is injected into the autoclave. Six hours after the first addition of titanium tetrachloride, 100 ml. of methanol are pumped into the autoclave and then the reaction product is discharged. It is a viscous liquid containing in suspension a fine powder.

The reaction mass is then treated with hydrochloric acid to dissolve the inorganic products present. By the addition of a large quantity of methanol a polymer coagulates; this polymer is filtered off and treated with acetone which is acid due to the presence of hydrochloric acid. In this way the amorphous polystyrene and the inorganic impurities, which are still present, are dissolved.

The residue which remains after the treatment with acetone is vacuum dried at 80° C.; 30 gms. of polystyrene consisting of a white powder, which appears highly crystalline when examined under the X-rays, are thus obtained.

The crystalline polystyrene obtained has a molecular weight of about 2,800,000 (as calculated from viscosimetric measurements in benzene at 25° C.), a density of 1.08 and a first-order transition point higher than 210° C.

The solvents employed in the purification and polymerization are then vacuum concentrated, with heating, to a small volume and finally treated with methanol. The amorphous polymer is thus precipitated. This polymer is isolated by filtration and vacuum dried under heating. 50 gms. of a solid, amorphous polymer, having a molecular weight of about 10,000, are thus obtained.

The crystalline polystyrene can be easily processed by pressing or extruding only at temperatures higher than the roentgenographic melting point (1st order transition point) of about 230°. It can be oriented by drawing below this temperature.

EXAMPLE IV 91 gms. of styrene and 11.4 gms. of triethyl aluminum dissolved in 500 cc. of n-heptane are introduced into a 2150 cc. autoclave. 282 gms. of propylene are then added and the autoclave is heated to 62° C. At this temperature 3.8 gms. of $TiCl_4$ dissolved in 40 cc. of heptane are injected into the autoclave under nitrogen pressure. The temperature rises spontaneously to 100° C., and falls then slowly to 72° C. At this point a second addition of 3.8 gms. of $TiCl_4$ in 40 cc. heptane is made. After about 6 hours from the beginning of the run the unreacted gases are vented and 24 normal liters of propylene are recovered. Methanol is now pumped into the autoclave and the coagulated polymer obtained is purified in the usual way.

299 gms. of a solid, white polymer are obtained, which is fractionally extracted with boiling acetone, ethyl ether and n-heptane, in succession. The actone extracted fraction (A) corresponds to 14.6% of the total polymer and consists of oily products of low molecular weight. The ether extracted fraction (B) is 32.8% of the total polymer, and is a solid, amorphous product of rubber-like appearance. The n-heptane extracted fraction (C), 19.8% of the total, is a solid which becomes plastic at 90° C. The extraction residue, 32.8% of the total obtained polymer is a powdery solid having, by X-rays analysis, a content of crystalline polypropylene.

As will be apparent from the examples, polymers of unsaturated hydrocarbons embraced by the formula $CH_2$=CHR have been produced. In the formula $CH_2$=CHR for the unsaturated hydrocarbon R may have a total of from 3 to 16 carbon atoms. Also, copolymers of the alpha-olefins with each other and with other monomers copolymerizable therewith may be obtained.

The polymers of the alpha-olefins are, initially, mixtures of amorphous and crystalline polymers which can be separated with solvents. Because of the different solubilities of the polymerized alpha-olefins in organic solvents (see Table 2), different solvents are selected for use in fractionating the different polymerizates.

Filaments of the crystalline polymers can be obtained.

In general, when the alpha-olefins are polymerized in the presence of small amounts of other olefins or of a diolefin containing a vinyl group, the high polymer obtained have a certain crystallinity similar to that of an alpha-olefin homopolymer.

It will be evident from the foregoing that this invention provides wholly new polymers of the higher homologues of ethylene and of styrene which have, depending on their exact composition and molecular weights, widely varying properties which adapt them to a variety of uses in the plastic materials and elastomer arts.

Since some changes and modifications in the specified details given in the examples may be made in carrying out the invention, it is to be understood that it is not

What is claimed is:

1. As a new product, polystyrene consisting essentially of isotactic polystyrene made up of isotactic macromolecules having, for substantially the entire length of the macromolecular main chain, the type of stereoregular structure illustrated in the model of a portion of an isotactic polystyrene macromolecule fully extended in a plane, as shown in FIGURE 2 of the accompanying drawing, said polystyrene having a high molecular weight, being crystallizable and having, in the crystalline state, the following characteristics: a melting point of about 230° C., a period of identity in the range 6.6–6.7 A., and a density of 1.08, and being further characterized in being insoluble in boiling n-heptane.

2. Shaped articles of polystyrene according to claim 1.

3. A molding powder of polystyrene according to claim 1.

4. As a new product, polystyrene consisting essentially of isotactic macromolecules having, for substantially the entire length of the macromolecular main chain, the type of stereoregular structure illustrated in the model of a portion of an isotactic polystyrene macromolecule fully extended in a plane, as shown in FIGURE 2 of the accompanying drawing, said polystyrene having a high molecular weight, being crystalline, and having the followig characteristics: a melting point of about 230° C., a period of identity in the range 6.6–6.7 A., and a density of 1.08, and being further characterized in being insoluble in boiling n-heptane.

5. Shaped articles of polystyrene according to claim 4.

6. A molding powder of polystyrene according to claim 4.

7. As a new product, poly(n-pentene-1) consisting essentially of isotactic poly(n-pentene-1) made up of isotactic macromolecules having, for substantially the entire length of the macromolecule main chain, the type of stereoregular structure illustrated in the model of a portion of an isotactic poly(n-pentene-1) macromolecule fully extended in a plane, as shown in FIGURE 1 of the accompanying drawing.

References Cited

UNITED STATES PATENTS

| 2,691,647 | 10/1954 | Field et al. | 260—88.1 |
| 2,727,024 | 12/1955 | Field et al. | |
| 2,728,758 | 12/1955 | Field et al. | |

OTHER REFERENCES

Birshmein et al.: Zhur. Fiz. Khim, vol. 28, pp. 211–223, February 1954.

Schulz: Die Makromolekulare Chemie, vol. 3, pp. 159–163 (1949).

Huggins: J.A.C.S., vol. 66, pp. 1991–92, November 1944.

Natta et al.: C.A. 31, 45639–45641.

JAMES SEIDLECK, *Primary Examiner.*

U.S. Cl. X.R.

260—93.7